(12) United States Patent
Koo

(10) Patent No.: US 12,202,347 B1
(45) Date of Patent: Jan. 21, 2025

(54) SYSTEM AND METHOD FOR CONTROLLING OUTPUT OF CONTENT IN VEHICLE

(71) Applicant: MABA INDUSTRIAL CO., LTD, Ulsan (KR)

(72) Inventor: Hyo Jeong Koo, Seoul (KR)

(73) Assignee: MABA INDUSTRIAL CO., LTD, Ulsan (KR)

( * ) Notice: Subject to any disclaimer, the term of this patent is extended or adjusted under 35 U.S.C. 154(b) by 0 days.

(21) Appl. No.: 18/805,371

(22) Filed: Aug. 14, 2024

(51) Int. Cl.
*B60K 35/81* (2024.01)
*B60K 35/28* (2024.01)
*B60K 35/65* (2024.01)

(52) U.S. Cl.
CPC .............. *B60K 35/81* (2024.01); *B60K 35/28* (2024.01); *B60K 35/656* (2024.01); *B60K 2360/1434* (2024.01); *B60K 2360/182* (2024.01)

(58) Field of Classification Search
CPC ...... B60K 35/81; B60K 35/28; B60K 35/656; B60K 2360/1434; B60K 2360/182
See application file for complete search history.

(56) References Cited

U.S. PATENT DOCUMENTS

2024/0017616 A1\* 1/2024 Taguchi .................. B60R 11/02

FOREIGN PATENT DOCUMENTS

| KR | 10-2018-0128705 A | 12/2018 |
|---|---|---|
| KR | 10-2019-0087927 A | 7/2019 |
| KR | 10-2023-0037423 A | 3/2023 |
| KR | 10-2023-0073731 A | 5/2023 |

OTHER PUBLICATIONS

PE2E Merged English Translation and Foreign Copy of CN 112394896 A (Year: 2021).*

\* cited by examiner

*Primary Examiner* — Justin S Lee
*Assistant Examiner* — Andrew Sang Kim
(74) *Attorney, Agent, or Firm* — AEON Law, PLLC; Adam L. K. Philipp; Ki Yong O

(57) ABSTRACT

A system and method for controlling an output of content in a vehicle are provided. In the system and the method for controlling an output of content in a vehicle according to some embodiments of the present disclosure, a content source may be adjusted and outputted to correspond to a main display, and the main contents of the content source may be converted and outputted into additional contents so as to correspond to a sub display. Accordingly, the content source may be provided so that nearby users can be more comfortable and can easily check key contents in consideration of the characteristics of a display unit disposed in a first vehicle, and the effectiveness of providing the content may become higher, thereby the purpose of providing the content may be achieved more easily.

7 Claims, 15 Drawing Sheets

Platooning

SYSTEM AND METHOD FOR CONTROLLING OUTPUT OF CONTENT IN VEHICLE

CROSS-REFERENCE TO RELATED APPLICATION

This application claims priority under 35 U.S.C § 119 to Korean Patent Application No. 10-2023-0150890 filed on Nov. 3, 2023, in the Korean Intellectual Property Office, the entire contents of which are hereby incorporated by reference.

TECHNICAL FIELD

The disclosure relates to a system and a method for controlling an output of content that is output in a vehicle. Particularly, the disclosure relates to a system and a method for controlling an output of content in consideration of the characteristics of a plurality of displays disposed inside/outside a vehicle.

Explanation on state-supported research and development. This study was conducted under the management of the Korea Evaluation Institute of Industrial Technology and with the support of the "Development of Multipurpose Mobility (PVB) Cabin Design Technology" (Project Identification Number: 1415181143) of the Design Industry Technology Development Project of the Ministry of Trade, Industry and Energy.

BACKGROUND

The contents set forth in this section merely provide background information on the present embodiments and do not constitute prior art.

With the fourth industrial revolution, the conceptual change, in particular, the conceptual change from "owning" a vehicle to "using" or "sharing" a vehicle, is occurring, and related markets and related services are experiencing explosive growth.

In particular, since a plurality of users can use vehicles shared for various purposes, development of a purpose built vehicle (hereinafter, "PBV") for satisfying various changes in mobility purpose and user's various needs has been actively underway.

For the PBV, displays having various types and features (PDLC, flexible display, transparent display, and projector) may be disposed inside and outside a vehicle. The PBV may be controlled to provide more information in accordance with the purpose and situation of operation in comparison to the analog type information indication in the related art.

Therefore, the applicant of the disclosure came up with suggestions for a method and a system that can output content more efficiently in consideration of the characteristics and relationships of various display devices disposed in the PBV.

SUMMARY

An object of the present disclosure is to provide a system and a method for controlling an output of content in consideration of the characteristics of a plurality of displays disposed inside/outside a vehicle.

The objects of the present disclosure are not limited to the objects mentioned above, and other objects and advantages of the present disclosure that have not been mentioned can be understood by the following description and will be more clearly understood by the embodiments of the present disclosure. Further, it will be readily appreciated that the objects and advantages of the present disclosure may be realized by the means set forth in the claims and combinations thereof.

According to some aspects of the disclosure, a system for controlling an output of content in a vehicle, the system comprises, a first vehicle, a first display disposed in the first vehicle, a second display disposed in the first vehicle next to the first display, and including a display panel of a different type from the first display, and a content output module configured to control content that is outputted onto the first display and the second display, wherein the content output module includes, a content analysis processor configured to generate content conversion information by analyzing a content source, characteristic information of the first display, and characteristic information of the second display, a content conversion processor configured to generate a converted content by converting the content source based on the content conversion information, and a content providing processor configured to provide the converted content to the first display and the second display, wherein the first display and the second display operate at different scan rates, and wherein in case that there occurs a difference between scan rates of the first display and the second display, which is larger than a predetermined threshold value, the content analysis processor is configured to generate the content conversion information so that a boundary area is outputted between the first display and the second display.

According to some aspects, the content analysis processor is configured to determine a main display on which the content source is outputted and a sub display on which the content source is not outputted between the first display and the second display based on the characteristic information of the first display and the characteristic information of the second display, wherein the content conversion information includes first content conversion information for converting main contents of the content source into additional contents in consideration of characteristic information of the sub display, and second content conversion information for converting the content source in consideration of characteristic information of the main display, and wherein the converted content includes a first converted content that is generated based on the first content conversion information and is provided to the sub display, and a second converted content that is generated based on the second content conversion information and is provided to the main display.

According to some aspects, a touch panel is formed on only any one of the first display and the second display, and wherein in case that the content source includes a touch input interface, the content analysis processor is configured to generate the second content conversion information so that the touch input interface is displayed to correspond to the display on which the touch panel is formed.

According to some aspects, a touch panel is formed to correspond to a specific area of the first display, and wherein in case that the content source includes a touch input interface, the content analysis processor is configured to generate the second content conversion information so that the touch input interface is displayed to correspond to the specific area of the first display on which the touch panel is formed.

According to some aspects, further comprising a second vehicle including a third display, wherein the content output module is configured to configure contents to be outputted on the third display based on the content source in consideration of a relationship between the second vehicle and the first vehicle and to provide the configured contents to the third display.

According to some aspects, the content output module is configured to: collect state information of a passenger boarding the vehicle in real time or in near real time, generate generative content obtained by transforming an original content source in real time or in near real time in accordance with the state information of the passenger, and provide the generative content to the content analysis processor as the content source.

According to some aspects of the disclosure, a system for controlling an output of content in a vehicle, the system comprises, a first vehicle, a first display disposed on an outside of the first vehicle, a second display disposed on the outside of the first vehicle next to the first display, and including a display panel of different type from the first display, and a content output module configured to control content that is outputted onto the first display and the second display, wherein the content output module includes, a content analysis processor configured to generate content conversion information by analyzing a content source, characteristic information of the first display, and characteristic information of the second display, a content conversion processor configured to generate a converted content by converting the content source based on the content conversion information, and a content providing processor configured to provide the converted content to the first display and the second display, wherein the content conversion module further includes an interface generation processor configured to implement a user environment including a content selection interface that determines the content source and a content output interface that provides a display state of the vehicle in accordance with the content conversion information, wherein the interface generation processor is configured to provide the user environment to a user equipment, and wherein the vehicle display state of the content output interface is configured to display an exterior design of the first vehicle, content that is outputted on the first display, and content that is outputted on the second display together.

According to some aspects of the disclosure, a method performed by a processor for controlling an output of content in a vehicle, which is outputted on a first display and a second display adjacently disposed in a first vehicle, the method comprises, generating content conversion information by analyzing a content source, characteristic information of the first display, and characteristic information of the second display, generating a converted content by converting the content source based on the content conversion information, and providing the converted content to the first display and the second display, wherein the first display and the second display operate at different scan rates, and wherein the generating of the content conversion information includes generating the content conversion information so that a boundary area is outputted between the first display and the second display in case that there occurs a difference between the scan rates of the first display and the second display, which is larger than a predetermined threshold value.

Aspects of the disclosure are not limited to those mentioned above and other objects and advantages of the disclosure that have not been mentioned can be understood by the following description and will be more clearly understood according to embodiments of the disclosure. In addition, it will be readily understood that the objects and advantages of the disclosure can be realized by the means and combinations thereof set forth in the claims.

In the system and the method for controlling an output of content in a vehicle according to some embodiments of the present disclosure, a content source may be adjusted and outputted to correspond to a main display, and the main contents of the content source may be converted and outputted into additional contents so as to correspond to a sub display. Accordingly, the content source may be provided so that nearby users can be more comfortable and can easily check key contents in consideration of the characteristics of a display unit disposed in a first vehicle, and the effectiveness of providing the content may become higher, thereby the purpose of providing the content may be achieved more easily.

In addition to the above description, specific effects of the present disclosure will be described together while describing the following specific details for carrying out the present disclosure.

DETAILED DESCRIPTION OF THE PREFERRED EMBODIMENTS

Figure 1:
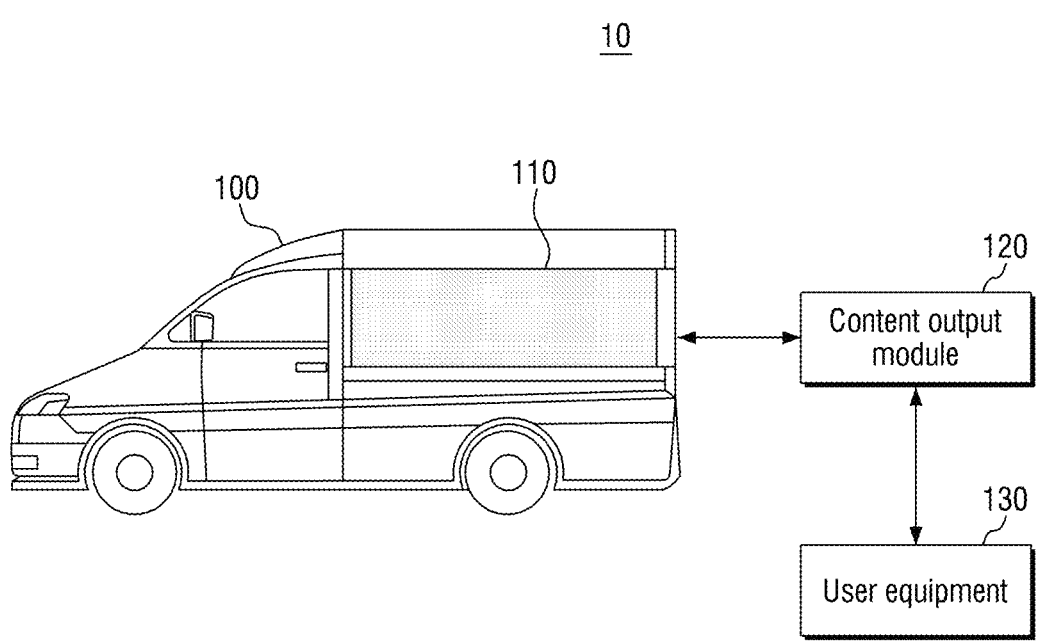
FIG. 1 is a block diagram illustrating the constitution of a system for controlling an output of content in a vehicle in accordance with some embodiments of the present disclosure.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own inventive concept in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are only used to differentiate one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular forms are intended to include plural forms unless the context clearly indicates otherwise. In the application, terms such as "comprise," "comprise," "have," etc. should be understood as not precluding the possibility of existence or addition of features, numbers, steps, operations, components, parts, or combinations thereof described herein.

Unless otherwise defined, the phrases "A, B, or C," "at least one of A, B, or C," or "at least one of A, B, and C" may refer to only A, only B, only C, both A and B, both A and C, both B and C, all of A, B, and C, or any combination thereof.

Unless being defined otherwise, all terms used herein, including technical or scientific terms, have the same meaning as commonly understood by those skilled in the art to which the disclosure pertains.

Terms such as those defined in commonly used dictionaries should be construed as having a meaning consistent with the meaning in the context of the relevant art, and are not to be construed in an ideal or excessively formal sense unless explicitly defined in the application. In addition, each configuration, procedure, process, method, or the like included in each embodiment of the disclosure may be shared to the extent that they are not technically contradictory to each other.

Hereinafter, a system for controlling an output of content in a vehicle in accordance with some embodiments of the present disclosure will be described with reference to FIGS. 1 to 12.

Figure 2A:
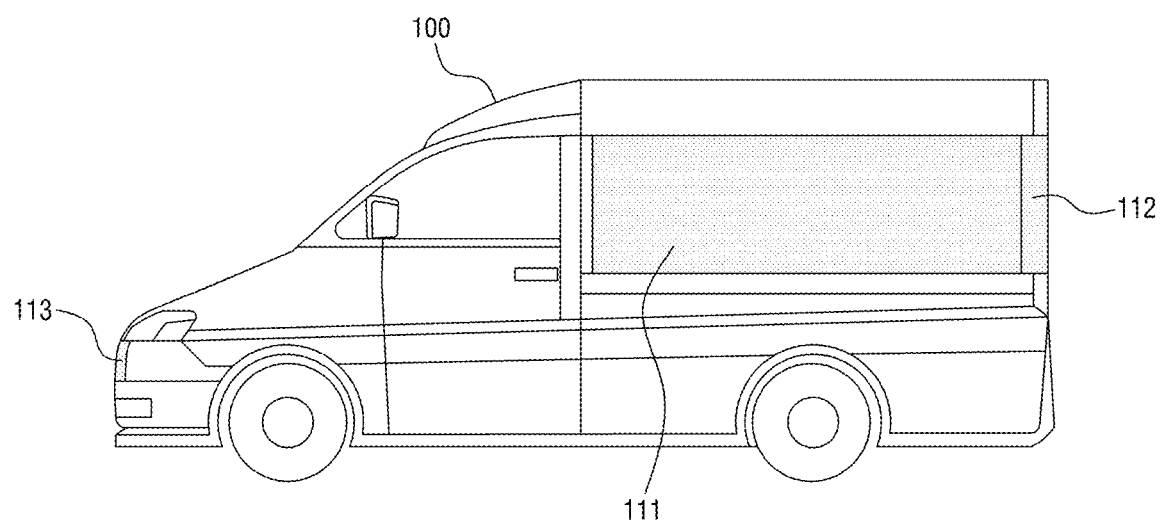
FIGS. 2A to 2C are exemplary diagrams explaining a plurality of displays disposed outside a vehicle.
Figure 2B:
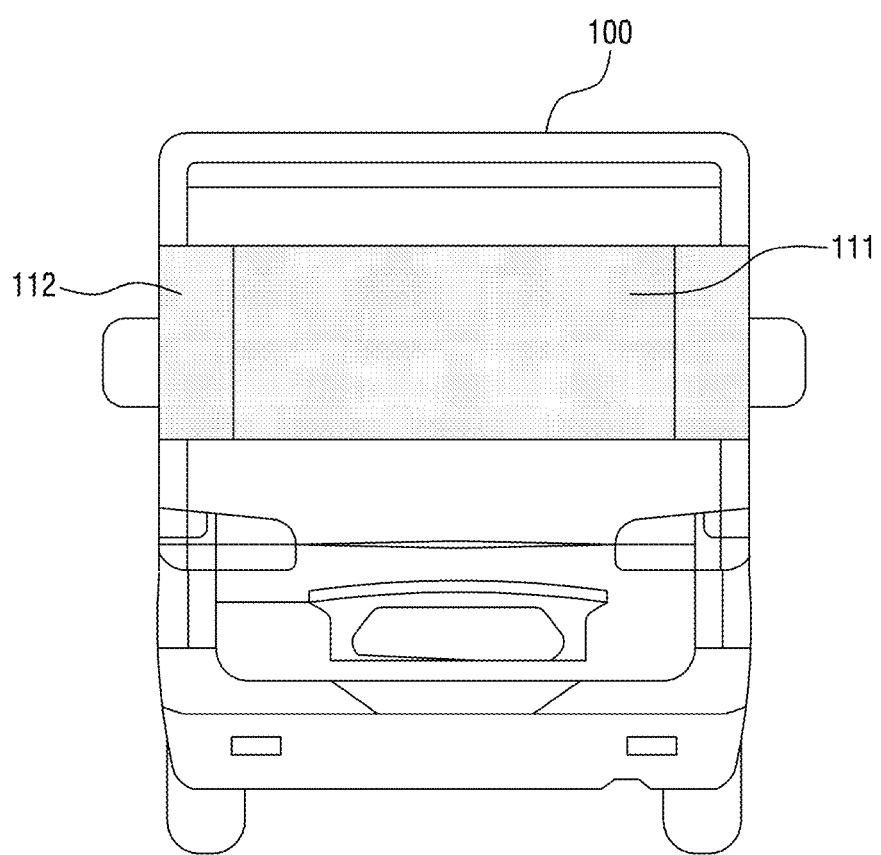
Figure 2C:
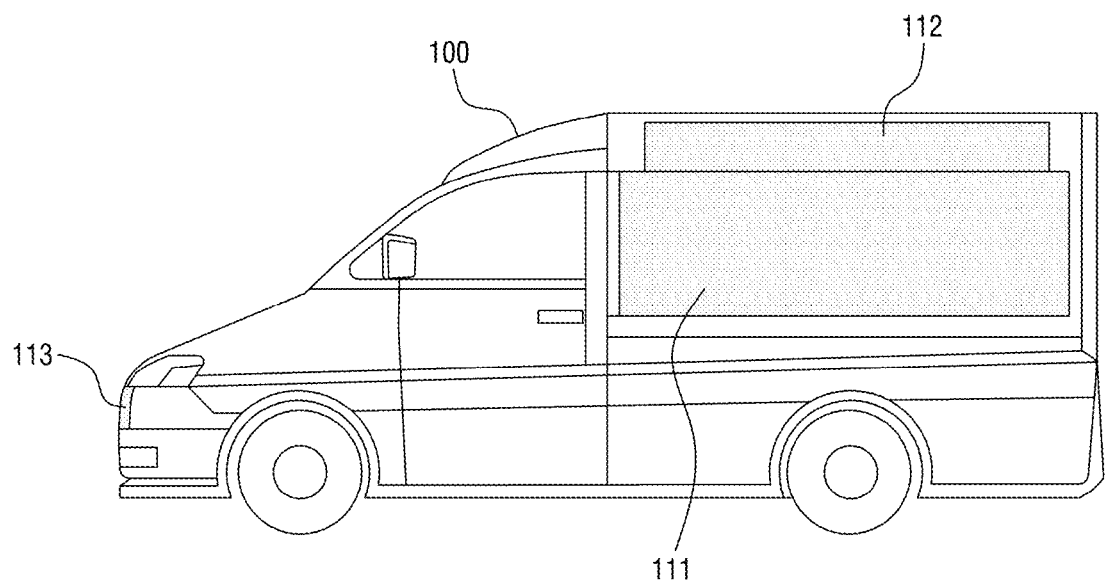
Figure 3A:
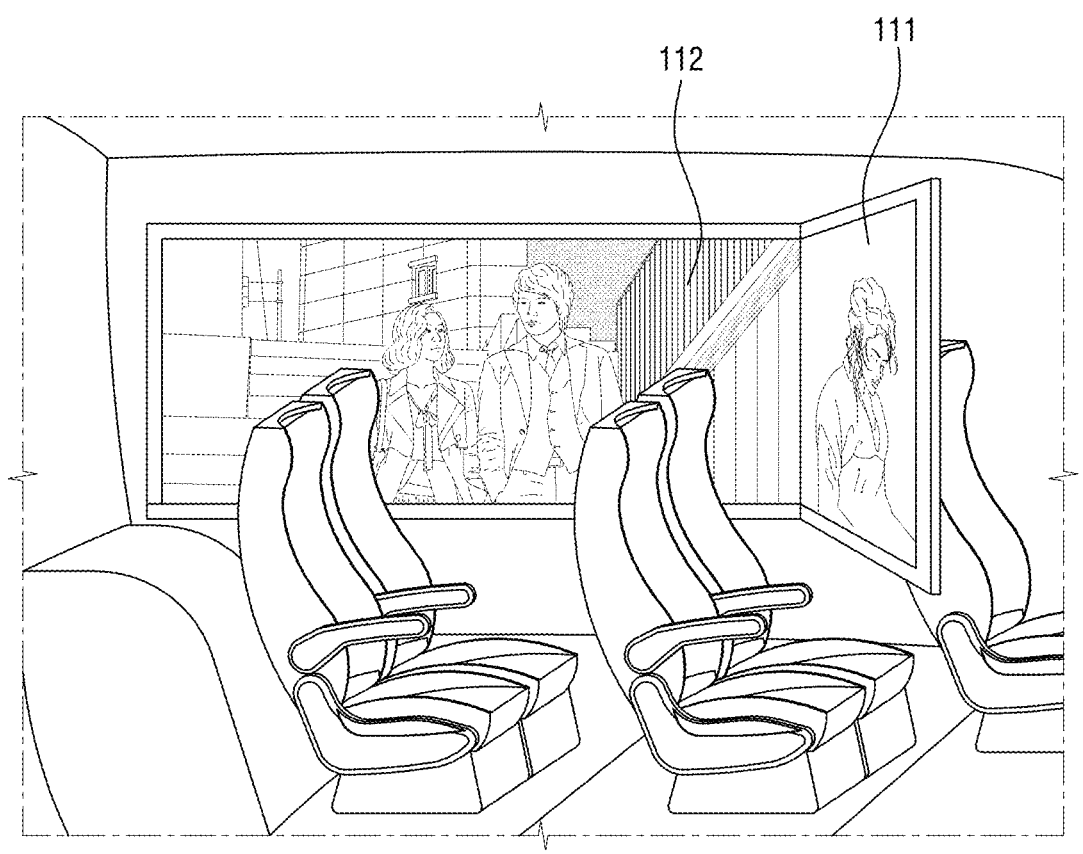
FIGS. 3A and 3B are exemplary diagrams explaining a plurality of displays disposed inside a vehicle.
Figure 3B:
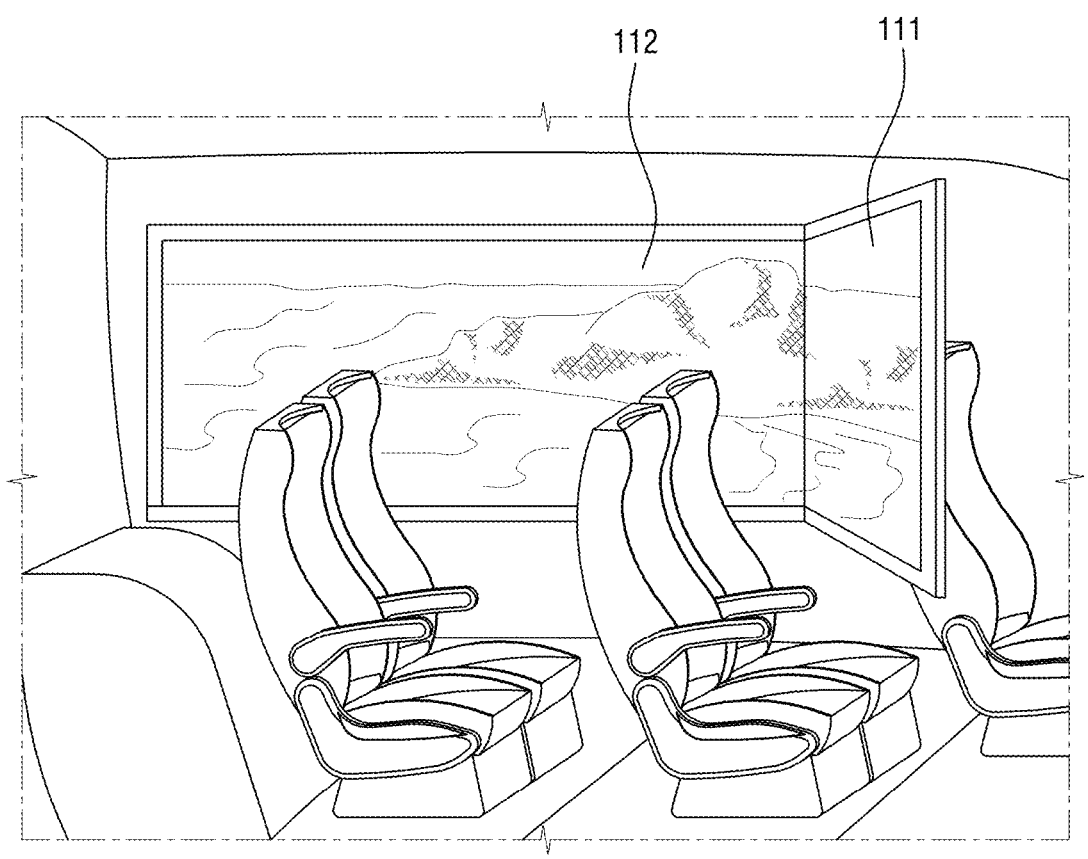

FIG. 1 is a block diagram illustrating the constitution of a system for controlling an output of content in a vehicle in accordance with some embodiments of the present disclosure. FIGS. 2A to 2C are exemplary diagrams explaining a plurality of displays disposed outside a vehicle. FIGS. 3A and 3B are exemplary diagrams explaining a plurality of displays disposed inside a vehicle.

Referring to FIG. 1, a system 10 for controlling an output of content in a vehicle includes a first vehicle 100, a display unit 110, a content output module 120, and a user equipment 130.

The first vehicle 100 means a multiple purpose vehicle or a purpose built vehicle (PBV) so as to be able to provide functions that respond to the purposes and needs of the user. Further, the first vehicle 100 may mean a multiple purpose vehicle (MPV) that can be utilized for various purposes, and may provide various services or may be flexibly changed for being used for various purposes through a configuration to be described later. That is, the first vehicle 100 may provide services to fit for various purposes together with the driving function that is the basic function of the vehicle. In order to form the first vehicle 100 to provide such multiple purpose services, the internal constitution of the first vehicle 100 may be changed freely. In the indoor space (cabin) of the first vehicle 100, various constitutions (seats, storage devices, and electronic devices) may be disposed, and such constitutions may be provided differently in accordance with the services. Further, on at least one of the interior and exterior of the first vehicle 100, a display device may be disposed to provide information related to the multiple purpose services.

The display unit 110 corresponds to a display device that provides information related to the first vehicle 100 or various pieces of content to various objects located around the first vehicle 100 or passengers boarding the first vehicle 100. The display unit 110 may be disposed on at least one of the front side, left side, right side, and rear side of the first vehicle 100, and may be configured to output information or content in accordance with their respective locations. Exemplarily, the display disposed on the left side of the first vehicle 100 may output information for being provided to a vehicle traveling in the opposite lane or in the left lane, and the display disposed on the right side of the first vehicle 100 may output information for a vehicle traveling in the right lane or a pedestrian. Further, the display disposed on the rear side of the first vehicle 100 may output information to a following vehicle, and the display disposed on the front side of the first vehicle 100 may output information to a vehicle traveling in the opposite lane. In an exemplary embodiment, it may be controlled so that at least one of the location of the vehicle 100 on which the display unit 110 is disposed, and the output state and the contents of the content being displayed along an outer surface of the vehicle 100 is automatically changed. Exemplarily, the display that displays information toward a vehicle on the opposite side may be controlled to output image content rather than a video.

The display unit 10 may include at least a first display 111 and a second display 112. The first display 111 and the second display 112 may be displays disposed next to each other. In some embodiments, the first display 111 and the second display 112 may be continuously disposed on the outside of the vehicle. The first display 111 and the second display 112 may be disposed side by side on the same part of the vehicle, but the disposition thereof is not limited thereto. The first display 111 and the second display 112 may be disposed in different parts of the vehicle. Here, the first display 111 and the second display 112 may be composed of different types of display panels in consideration of the disposition location or disposition purpose of the vehicle.

Referring to FIG. 2A, the first display 111 may be disposed on a side part of the vehicle, and the second display 112 may be disposed on a curved part that connects the side part and a rear part of the vehicle. Exemplarily, the first display 111 may be composed of a transparent display that corresponds to a side window constituting the side part of the vehicle, and the light transparency of the first display 111 may be selectively controlled. The transparent state of the first display 111 and the state where an image is displayed outside or inside the first display 111 maybe selectively controlled. The second display 112 may be composed of a display device having flexibility for being disposed to correspond to a corner area of the vehicle. For example, the second display 112 may be composed of a flexible display, and may be disposed to correspond to an appearance design of the vehicle.

Further, referring to FIG. 2B, the first display 111 may be disposed on the rear part of the vehicle, and the second display 112 may be disposed on the curved part that connects the side part and the rear part of the vehicle. The first display 111 may be a rear display corresponding to a rear window. The first display 111 may be a transparent display, but is not limited thereto. As shown in FIG. 2B, the first display 111 may be constituted to correspond to the rear window, and may be controlled to be selectively in a transparent state or in a state where an image is displayed. The second display 112 may be composed of a display device having flexibility for being disposed to correspond to a corner area of the vehicle. For example, the second display 112 may be composed of a flexible display, and may be disposed to correspond to an appearance design of the vehicle.

Further, referring to FIG. 2C, the first display 111 and the second display 112 may be disposed together on the side part of the vehicle, but may be disposed in different areas. Exemplarily, the first display 111 may be composed of a transparent display that corresponds to the side window constituting the side part of the vehicle, and the light transparency thereof may be selectively controlled. The second display 112 may be disposed on a roof periphery of the vehicle. The second display 112 may be composed of a display device having flexibility. For example, the second display 112 may be composed of a flexible display, and may be disposed to correspond to an appearance design of the vehicle.

In some embodiments, the first display 111 and the second display 112 may be continuously disposed on an inside of the first vehicle 100. However, the areas where the first display 112 and the second display 112 are disposed inside the first vehicle 100 may be different from each other.

Referring to FIGS. 3A and 3B, the first display 111 may be disposed in front of where passengers are boarded, and the second display 112 may be constituted to correspond to the side window. The first display 111 may be constituted to reproduce content only, and may be a display device for an output of a high definition video. Exemplarily, the first display 111 may be composed of a high-definition and high-resolution display panel such as OLED or QLED, but is not limited thereto. The second display 112 may be composed of a transparent display, and the light transparency thereof may be selectively controlled.

Here, as shown in FIG. 3A, the first display 111 and the second display 112 may each display different pieces of content. However, the first display 111 and the second display 112 may not be limited to display the different pieces of content, but as shown in FIG. 3B, may be constituted to display one piece of content together or may be constituted to display content that is derived from one content source together.

In some embodiments, the display unit 110 may further include a third display 113 that is not continuously disposed with the first display 111 and the second display 112, but outputs content related to the first display 111 and the second display 112. The third display 113 may be disposed outside or inside the first vehicle 100, but the disposition of the third display 113 is not limited thereto. As exemplarily illustrated in FIGS. 2A and 2C, the third display 113 may be disposed at the front of the vehicle 100, but disposition of the third display 113 is not limited thereto. In some embodiments, the third display 113 may be disposed to correspond to the roof of the vehicle.

The content output module 120 may control the content that is outputted from the first display 111, the second display 112, and the third display 113. The content output module 120 may have an entirely hardware aspect, or a partially hardware and partially software aspect. For example, the content output module 120 is intended to refer to a combination of the hardware and the software that is driven by the corresponding hardware. The hardware may be a data processing device including a central processing unit (CPU) or another processor. Further, the software that is driven by the hardware may refer to a process being executed, an object, an executable, a thread of execution, a program, or the like.

The user equipment 130 corresponds to a user's electronic device that can exchange data with the content output module 120. The user equipment 130 may exchange data with the content output module 120 through a network. Here, the user may be a passenger boarding the first vehicle 100 or the owner of the vehicle, but is not limited thereto.

The content output module 120 may provide a user environment to the user equipment 130 that allows to check, select, and control the content that is outputted from the display unit 110 of the first vehicle 100. The user of the user equipment 130 may select the content to be outputted from the first vehicle 100 through such a user environment, or may check the output state of the selected content.

The content output module 120 according to an embodiment of the present disclosure may automatically convert the content source selected through the user environment in consideration of the characteristic of the display 110, and may control the converted content to be outputted to the display 110.

Figure 4:
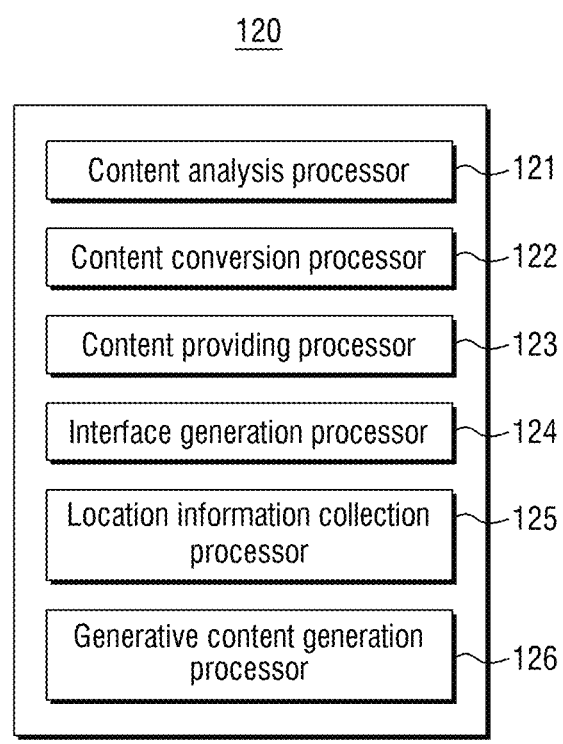
FIG. 4 is a block diagram illustrating the constitution of a content output module according to some embodiments of the present disclosure.
Figure 5:
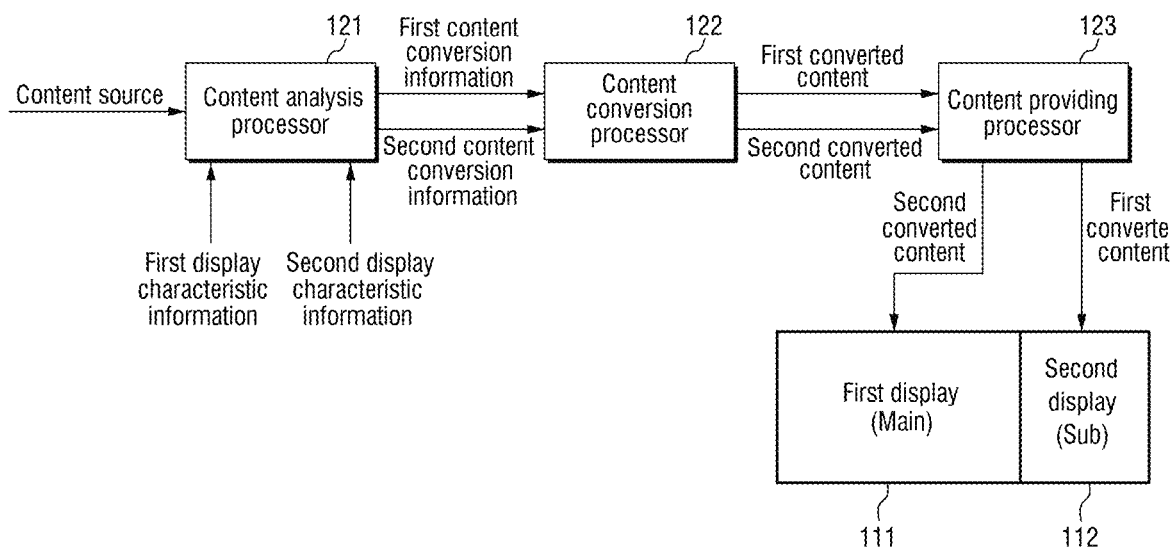
FIG. 5 is an exemplary diagram explaining a process in which a content output module generates transformed content in consideration of characteristic information of a display unit.
Figure 5:
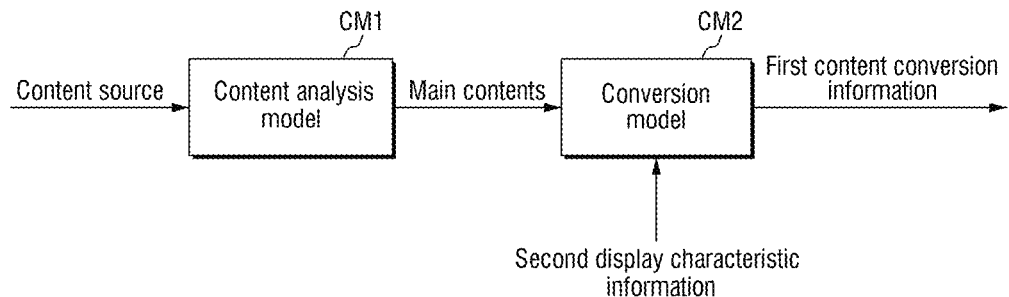
Figure 6:
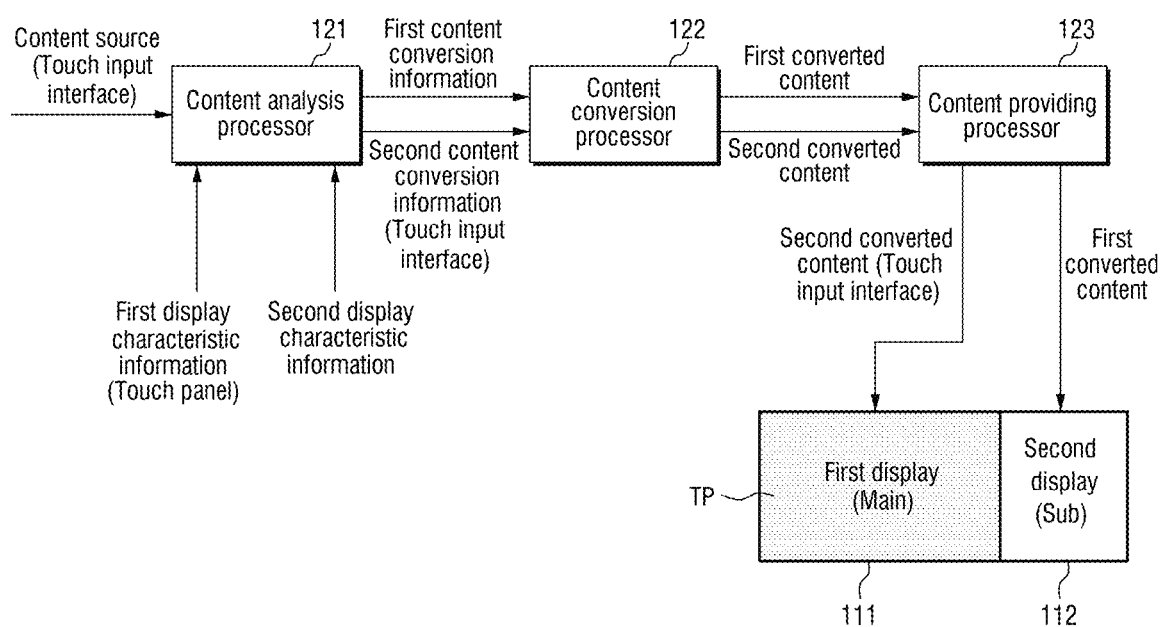
FIG. 6 is an exemplary diagram explaining a process in which a content output module generates transformed content in consideration of touch panel information.
Figure 7:
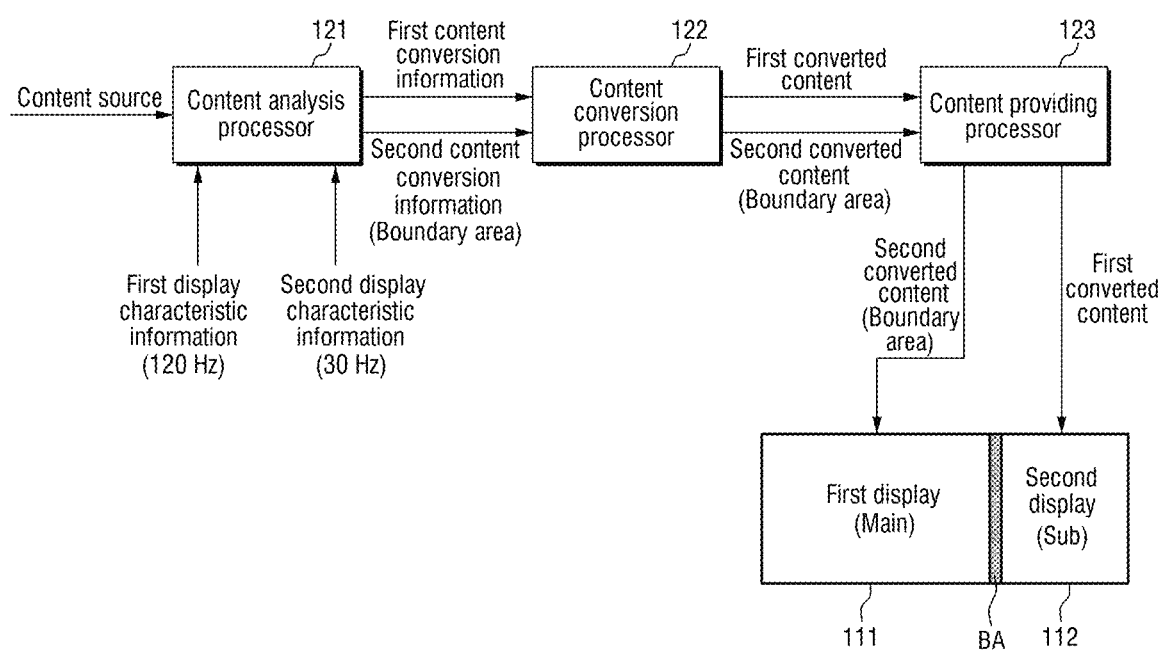
FIG. 7 is an exemplary diagram explaining a process in which a content output module configures a boundary area.
Figure 8:
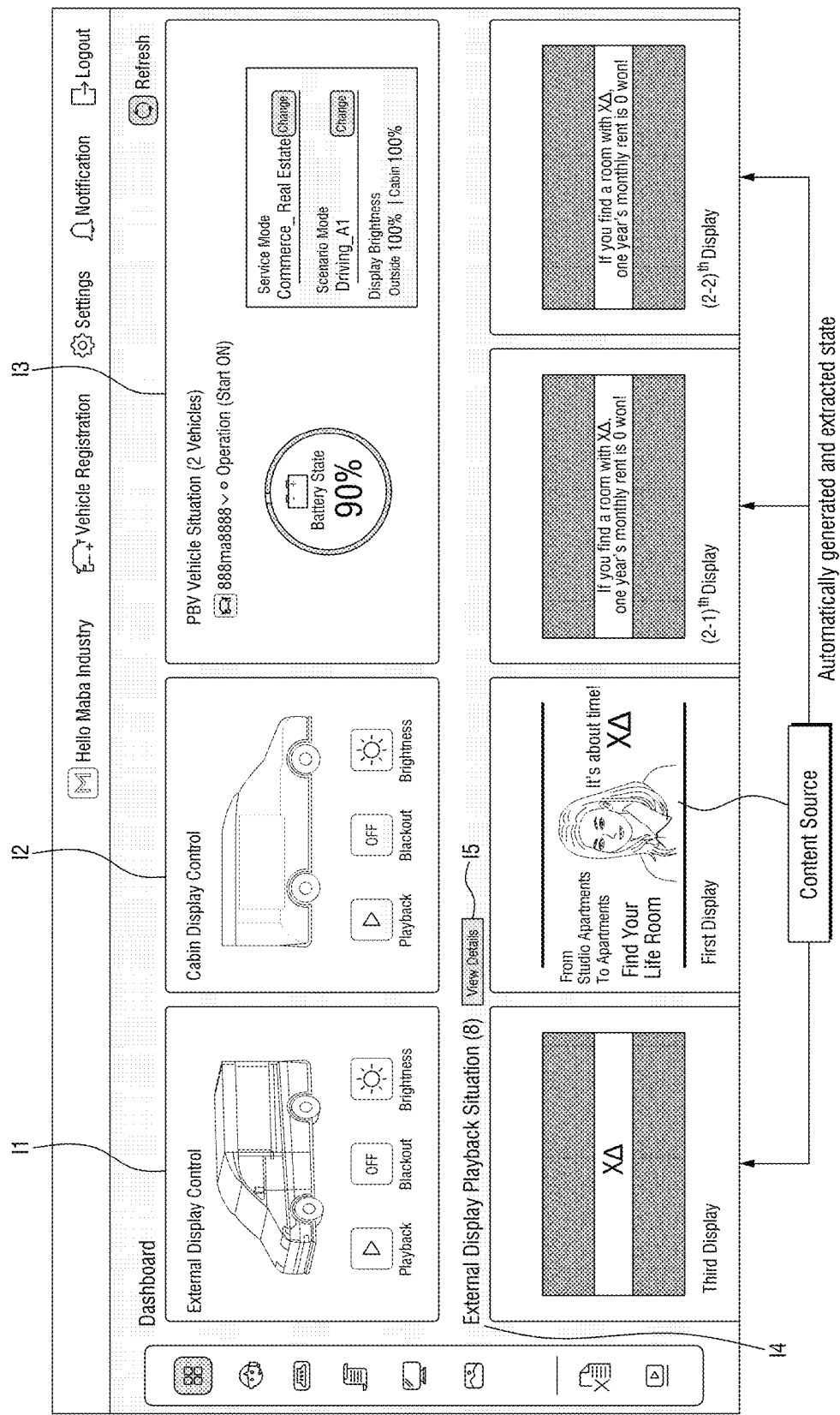
FIG. 8 is an exemplary diagram of a user environment that is provided by an interface generation processor.
Figure 9:
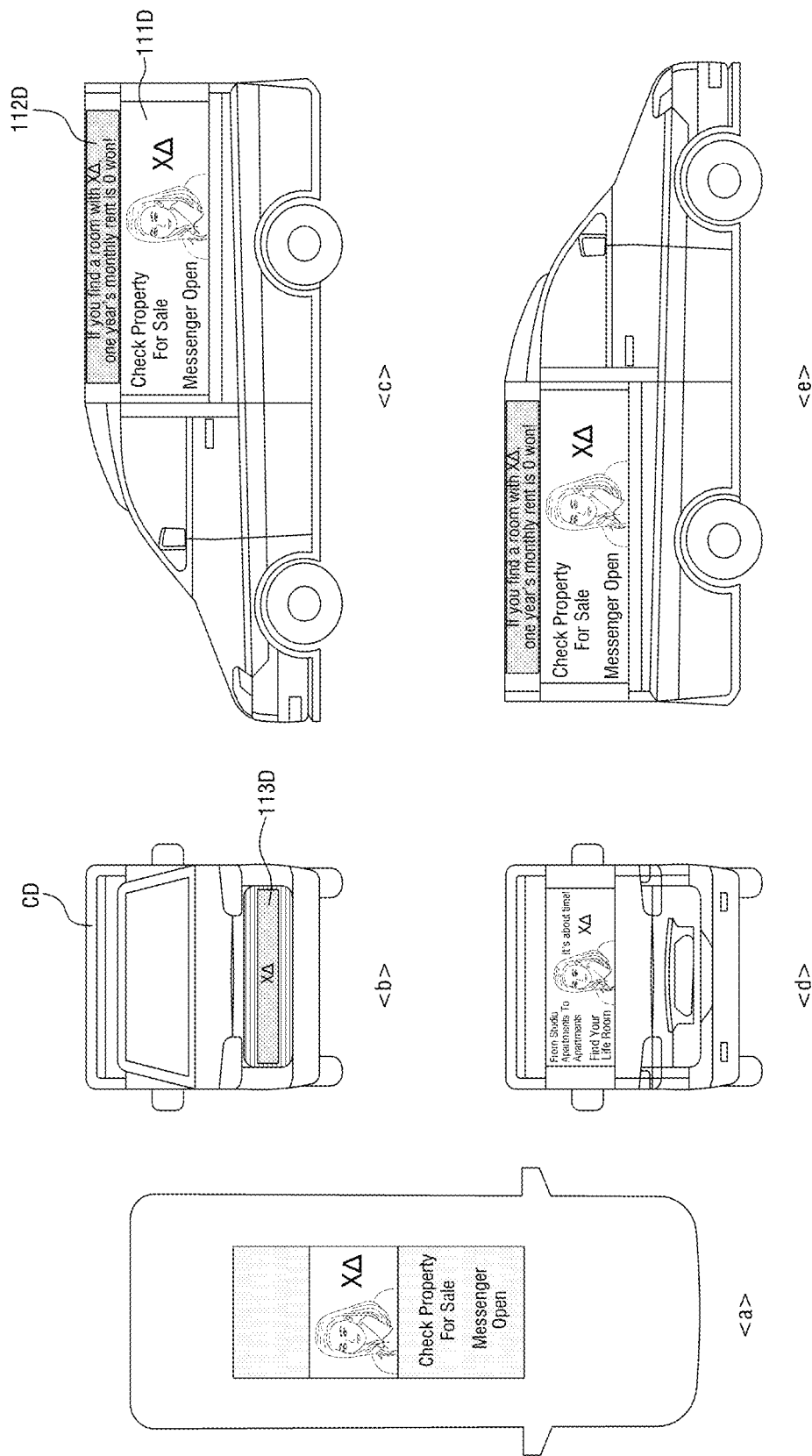
FIG. 9 exemplarily illustrates an operation screen of a content output interface that is provided in a user environment of FIG. 8.
Figure 10:
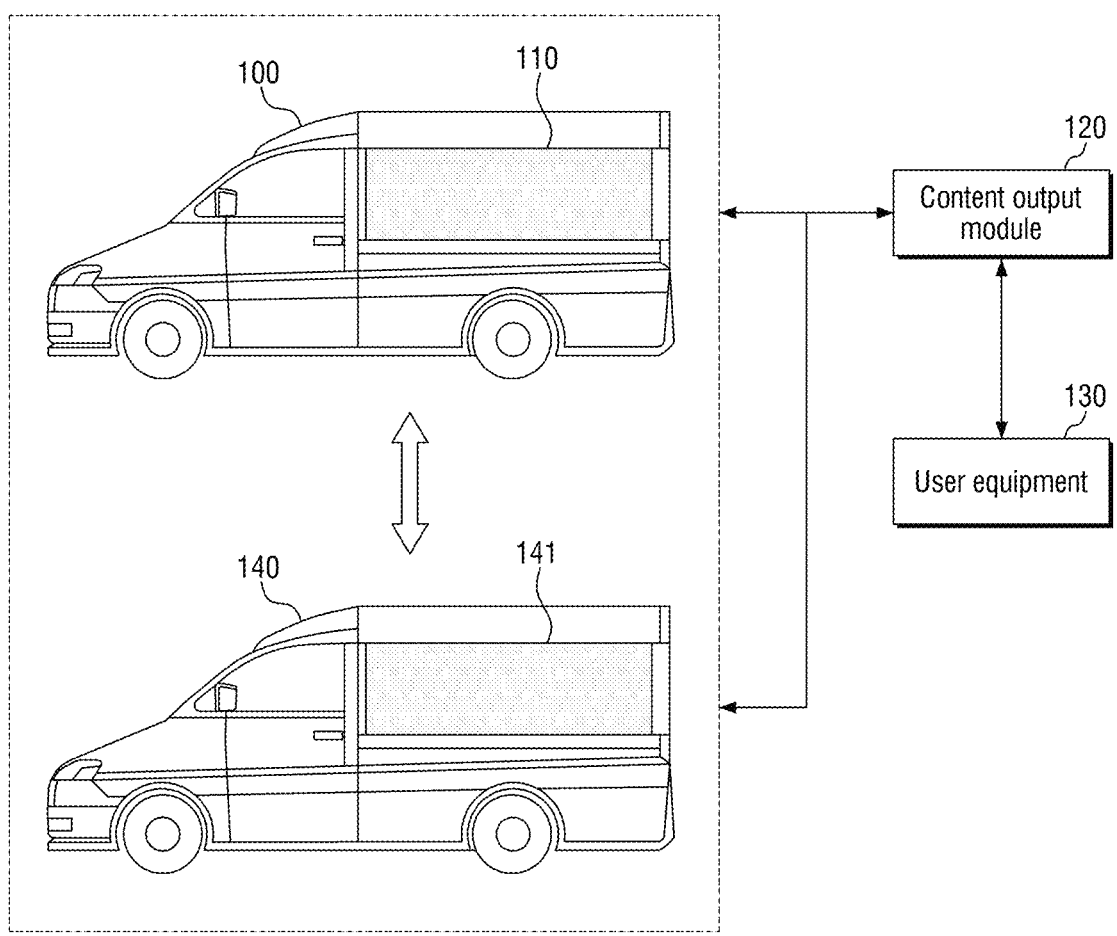
FIG. 10 is an exemplary diagram explaining a first vehicle and a second vehicle that perform autonomous platooning.
Figure 11:
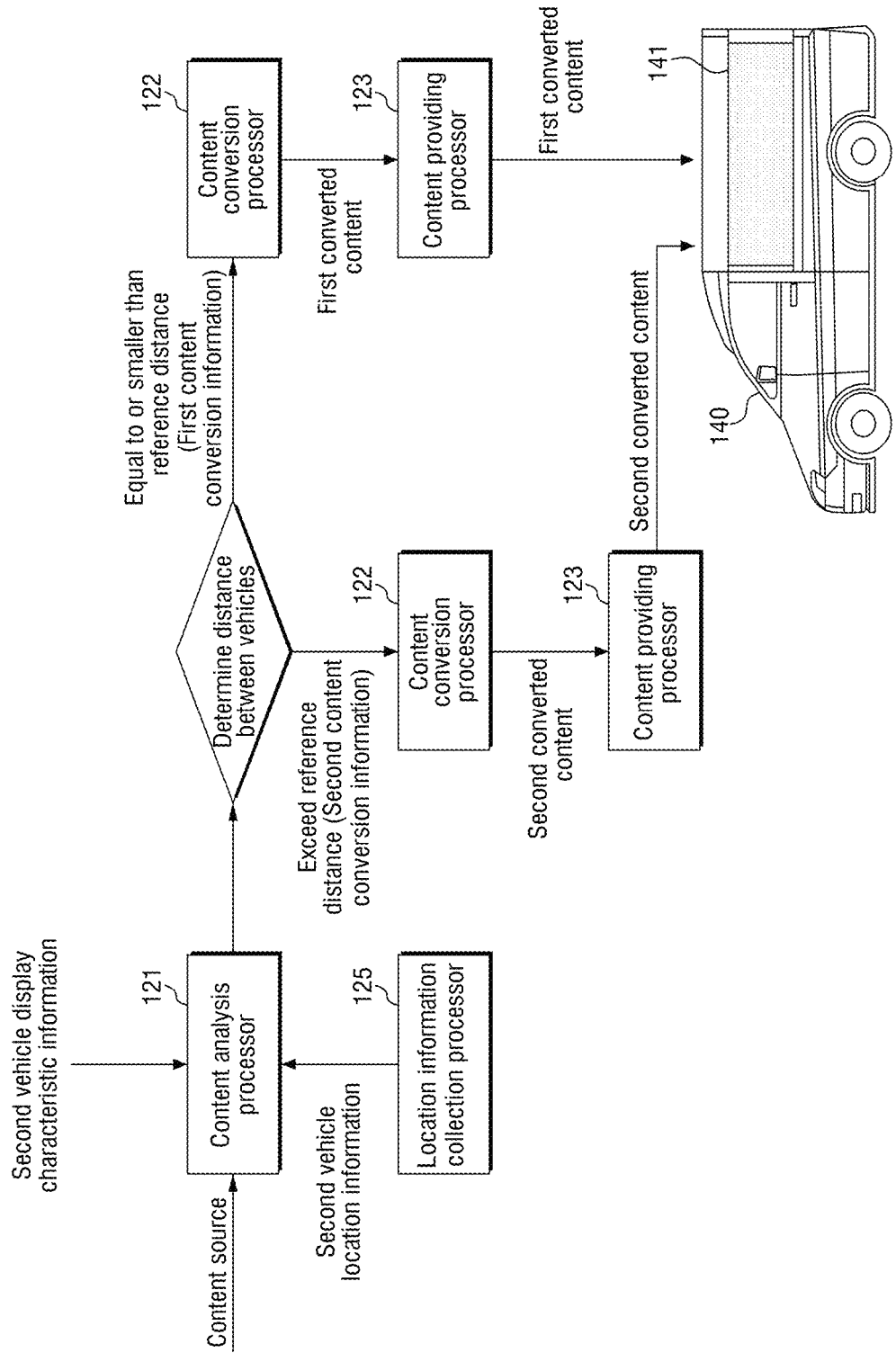
FIG. 11 is an exemplary diagram explaining a process of transforming content in consideration of location information of a second vehicle of FIG. 10.
Figure 12:
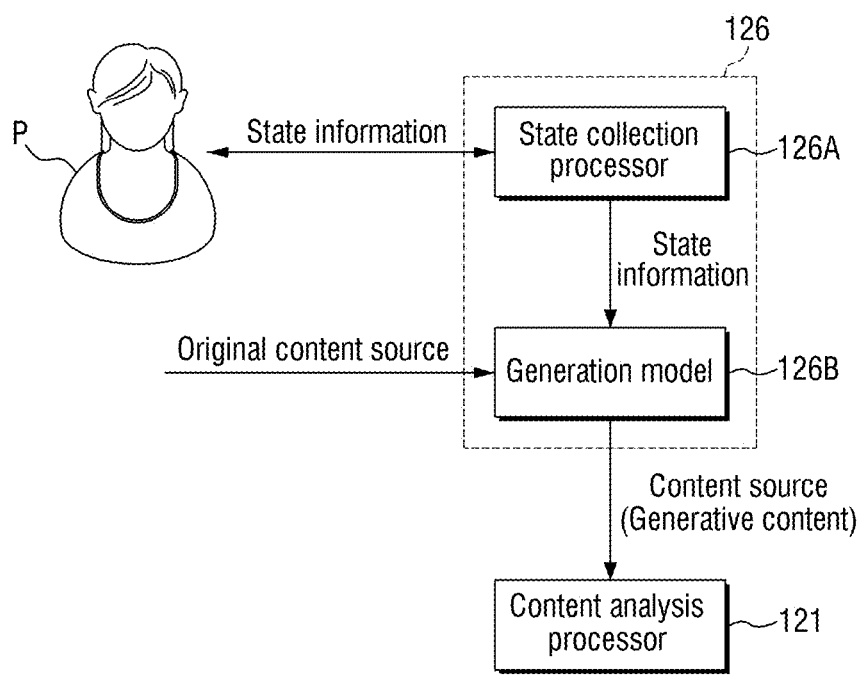
FIG. 12 is an exemplary diagram explaining a process of generating generative content based on state information of a passenger.

FIG. 4 is a block diagram illustrating the constitution of a content output module according to some embodiments of the present disclosure. FIG. 5 is an exemplary diagram explaining a process in which a content output module generates transformed content in consideration of characteristic information of a display unit. FIG. 6 is an exemplary diagram explaining a process in which a content output module generates transformed content in consideration of touch panel information. FIG. 7 is an exemplary diagram explaining a process in which a content output module configures a boundary area. FIG. 8 is an exemplary diagram of a user environment that is provided by an interface generation processor. FIG. 9 exemplarily illustrates an operation screen of a content output interface that is provided in a user environment of FIG. 8. FIG. 10 is an exemplary diagram explaining a first vehicle and a second vehicle that perform autonomous platooning. FIG. 11 is an exemplary diagram explaining a process of transforming content in consideration of location information of a second vehicle of FIG. 10. FIG. 12 is an exemplary diagram explaining a process of generating generative content based on state information of a passenger.

Referring to FIG. 4, a content output module 120 includes a content analysis processor 121, a content conversion processor 122, a content providing processor 123, an interface generation processor 124, a location information collection processor 125, and a generative content generation processor 126.

The content analysis processor 121 may generate content conversion information by analyzing a content source and characteristic information of the display unit 110. Further, the content analysis processor 121 may generate content conversion information in consideration of the content source and location information of another vehicle that is provided from the location information collection processor 125. The content analysis processor 121 may generate the content conversion information by analyzing at least one of the characteristic information of the display unit 110 and the location information of the other vehicle and the content source. The content may be provided to the content analysis processor 121 based on a user input by the user equipment 130 or the like. In some embodiments, the generative content generation processor 126 may generate generative content based on the user state, and provide the generative content to the content analysis processor 121.

The content conversion processor 122 may generate converted content by converting the content source based on the content conversion information. The content providing processor 123 may provide the converted content to the display unit 110.

The content analysis processor 121 may generate the content conversion information by analyzing the content source, the characteristic information of the first display 111 and the characteristic information of the second display 112.

The first display 111 and the second display 112 may be located next to each other, but may include different display panels. That is, the first display 111 and the second display 112 may differ from each other in at least one of the resolution, screen size, scan rate, and display type of the display panels.

The first display 111 may be configured to have higher resolution than the resolution of the second display 112, or may be configured to have a larger size than the size of the second display 112. In case of displaying the content source together on the first and second displays 111 and 112 which are located next to each other, but have the different characteristics, the display condition may not be uniform, and a sense of heterogeneity may occur as the screen size is changed. Further, in case of displaying the content sources on the first and second displays 111 and 112, respectively, the same contents are displayed in duplicate, and thus the problem occurs that the user's concentration is rather decreased, and as the videos in the different display states are provided together, discomfort may occur in the user's content viewing. That is, in case of uniformly displaying the content source as it is on the first display 111 and the second display 112, the sense of heterogeneity may occur, and user's concentration on the content being displayed is decreased, and thus it is disturbed to arouse interest.

The content analysis processor 121 may generate the content conversion information for converting the content source so that the content in accordance with the content source can be efficiently provided to a user in consideration of the characteristic of the first display 111 and the characteristic of the second display 112.

Referring to (a) of FIG. 5, the content analysis processor 121 may determine a main display that outputs the content source between the first display 111 and the second display 112 based on the characteristic information of the first display 111 and the characteristic information of the second display 112. Here, the characteristic information may include information related to the size of the display panel, the resolution of the display panel, and the scan rate of the display panel.

The content analysis processor 121 may determine one display in which any one of the size, resolution, and scan rate is relatively larger than that of the other display as a main display that outputs the content source. Between the first display 111 and the second display 112, the display having a relatively good condition and having a relatively excellent transfer and expression of the content may be selected as a main display, and the remaining display may be selected as a sub display.

In an example of (a) of FIG. 5, the first display 111 may have a relatively higher resolution and a relatively larger screen size than those of the second display 112, and the content analysis processor 121 may select the first display 111 as the main display, and may select the second display 112 as the sub display.

Further, the content analysis processor 121 may identify the main contents of the content source, and may generate information for converting the main contents in consideration of the characteristic information of the display that is determined as the sub display. In (b) of FIG. 5, a process in which the content analysis processor generates first content conversion information by analyzing the content source is exemplarily illustrated.

The content analysis processor 121 may include a content analysis model CM1 and a conversion model CM2. The content analysis model CM1 may be constituted to identify the main contents from the input content source, and the conversion model CM2 may be constituted to generate additional contents related to the main contents. Here, the content source may be a video or an image, and the main contents may mean a core keyword or an image intended to be transferred by the content source. Exemplarily, the main contents may be information that is provided in the highest proportion from the content source, and may correspond to at least one of an image and a text being repeatedly provided. Further, in case that the content source is an image, the main contents may be a specific part or contents being emphasized or being centrally located in the image.

The content analysis model CM1 and the conversion module CM2 may be pre-learned deep learning based artificial intelligence analysis models. The content analysis model CM1 may identify the main contents from the content source, and the conversion model CM2 may generate the additional contents related to the main contents. The additional contents may be generated by converting the main contents to conform to the characteristic information of the display on which the content source is not output. That is, the conversion model CM2 may generate the content conversion information for generating the additional contents in consideration of the main contents identified by the content analysis model CM1 and the characteristic information of the display that is determined as the sub display. For example, in the main contents corresponding to the keyword and the text, the additional contents may be configured through adjustment of a letter size or a letter output location in accordance with the characteristic information of the display. Further, in the main contents corresponding to the image, the additional contents may be configured through conversion into a specific keyword in accordance with the characteristic information of the display, adjustment of the size so as to conform to the characteristic information of the display, or cropping of the image so as to emphasize the main contents. Referring to (b) of FIG. 5, the conversion model CM2 may generate first content conversion information for generating the additional contents based on the main contents and the characteristic information of the second display.

The content analysis processor 121 may generate the first content conversion information for converting the main contents of the content source into the additional contents in consideration of the characteristic information of the sub display through the content analysis model CM1 and the conversion model CM2.

Further, the content analysis processor 121 may generate second conversion information for converting the content source to conform to the characteristic information that corresponds to the selected main display. Here, second content conversion information may include any one of information for converting the frame of the content source to conform to the main display and information for converting the size of the content source to conform to the size of the main display.

Referring to (a) of FIG. 5, the content conversion information generated by the content analysis processor 121 may include the first content conversion information and the second content conversion information. The content conversion processor 122 may generate a first converted content based on the first content conversion information, and may generate a second converted content based on the second content conversion information. The content providing processor 123 may provide the first converted content to the second display 112 that is the sub display, and may provide the second converted content to the first display 111 that is the main display.

Through the data processing process of the content output module 120, the content source may be adjusted and outputted to correspond to the main display, and the main contents of the content source may be converted into the additional contents and outputted to correspond to the sub display. Accordingly, the content source may be provided so that nearby users can be more comfortable and can check the core contents easily in consideration of the characteristic of the display unit 110 disposed in the first vehicle 100, and the content providing can become more effective, and the purpose of the content providing can be achieved more easily.

Referring to FIG. 6, in some embodiments, the content source may include a touch input interface. The content source may include an input interface for being provided with a user input through the display unit 110. Here, a touch panel may be formed on only any one of the first display 111 and the second display 112. Whether to include the touch panel may be included in the characteristic information of the display. In case that the content source includes the touch input interface, the content analysis processor 121 may generate the content conversion information so that the touch input interface is displayed to correspond to the display on which the touch panel is formed.

In case that the content source includes the touch input interface, the content analysis processor 121 may determine that the display on which the touch panel is formed is the main display. In an example of FIG. 6, the first display 111 may be in a state where a touch panel TP is formed thereon, and the first display 111 may be determined as the main display. The content analysis processor 121 may configure the second content conversion information so that the touch input interface is outputted onto the first display 111.

Here, the touch panel TP may be formed on the first display so as to correspond to the entire area of the display panel of the first display 111, but the embodiment of the present disclosure is not limited thereto. The touch panel TP may have the size that corresponds to a part of the display panel of the first display 111, and may be constituted to partially cover the first display 111. That is, the touch panel TP may be in a state of being formed to correspond to a specific area of the first display 111. The characteristic information of the first display may further include disposition information on the touch panel constituted on the first display 111. The content analysis processor 121 may generate the second content conversion information so that the touch input interface is outputted to correspond to the location where the touch panel is disposed and the specific area in further consideration of the disposition information of the touch panel.

Through the data processing process of the content output module 120, the content source having the touch input interface may be adjusted and outputted to correspond to the display having the touch panel, and the main contents of the content source may be converted into the additional contents and outputted to correspond to the sub display. Accordingly, the content source may be provided so that nearby users can be more comfortable and can check the core contents easily in consideration of the characteristic of the display unit 110 disposed in the first vehicle 100, and the content providing by using the touch input interface can become more effective, and the purpose of the content providing can be achieved more easily.

Referring to FIG. 7, in some embodiments, the first display 111 and the second display 112 may operate at different scan rates. The first display 111 may have a relatively higher scan rate than the scan rate of the second display 112, and may provide a viewing environment of a higher quality to the user. The characteristic information of the first display may include scan rate information of the first display, and the characteristic information of the second display may include scan rate information of the second display. In some embodiments, the content analysis processor 121 may determine the display having the high scan rate as the main display, but is not limited thereto. Here, in case that there is a big difference between the scan rates of the first display 111 and the second display 112 that are successively disposed side by side, problems may occur in that the user who views the first and second displays 111 and 112 together may experience the sense of heterogeneity, and may suffer from an increased eye fatigue. The content analysis processor 121 may support that the user's viewing environment is comfortably set through the transformation of the content source.

In case that there occurs a difference between the scan rates of the first display 111 and the second display 112, which is larger than a predetermined threshold value, the content analysis processor 121 may generate at least one of the first content conversion information and the second content conversion information so that a boundary area is outputted onto the first display 111 and the second display 112. That is, the content analysis processor 121 may transform and configure at least one of the first content conversion information and the second content conversion information so that a boundary surface that defines the boundary of the first display 111 and the second display 112 is generated.

In an example of FIG. 7, a boundary area BA may be generated so that the boundary area BA is configured in the second content conversion information, and the boundary area BA may be configured on the first display 111 by the second converted content. In another example, a boundary area may be configured in the first content conversion information, or the boundary area may be configured in both the first content conversion information and the second content conversion information. That is, the boundary area may be displayed on at least one of the first display 111 and the second display 112. The boundary area may be displayed on a black screen as a blank area, but is not limited thereto. The boundary area may be configured to output an image corresponding to the appearance and color of the vehicle.

Through the data processing process of the content output module 120, the boundary area may be formed between the displays having the big difference between their scan rates, and the user's eye fatigue and the sense of heterogeneity of the screen in accordance with the difference between the scan rates can be prevented from occurring. Accordingly, the content source may be provided so that nearby users can be more comfortable and can easily check the core contents in consideration of the characteristic of the display unit 110 disposed in the first vehicle 100, and the purpose of the content providing can be achieved more easily.

Further, although the operation of the content output module 120 as described above has been exemplarily described with reference to the first display 111 and the second display 112, the data processing between the first and second displays may also be applied even between the first display 111 and the third display 113 in the same manner. That is, the content output module 120 may generate the content conversion information by analyzing the content source, the characteristic information of the first display, and the characteristic information of the third display, may generate the converted content by converting the content source based on the content conversion information, and may provide the converted content to the first display and the third display.

The interface generation processor 124 may provide the user environment to the user equipment 130. The user environment that is configured by the interface generation processor 124 may be an interface for determining the content being outputted from the display unit 110. In an embodiment, the user environment may include a content selection interface that determines the content source and a content output interface that provides the display state of the vehicle in accordance with the content conversion information. Further, the user environment may provide an interface which performs connection with the first vehicle 100 or the display unit 110, which provides state information of the connected vehicle, or which can control the operation of the display unit 110.

FIG. 8 illustrates an exemplary operation screen of a user environment. Referring to FIG. 8, a first interface 11 may be a control environment for performing a control (content reproduction, off, and brightness control) for a display disposed outside the first vehicle 100. A second interface 12 may be a control environment for performing a control (content reproduction, off, and brightness control) for a display disposed inside the first vehicle 100. A third interface 13 provides state information of the first vehicle 100 that is connected to the user environment. Through the third interface 13, the connected vehicle number, the current driving state, and a battery state can be checked. Further, in case that the first vehicle 100 is a purpose built vehicle (PBV), a plurality of service modes and a plurality of scenario modes in accordance with each service mode may be set. In accordance with the set plurality of service modes and/or scenario modes, the cabin constitution of the first vehicle 100 and the content and the information being provided from the display unit 110 may be different from one another. The third interface 13 may also provide information on the service mode and the scenario mode currently set in the first vehicle 100.

A fourth interface 14 may be an interface that supports setting of the content being outputted from the display unit 110. Based on one content source, the converted content may be generated in consideration of the characteristic of the display unit 110, and the state where the generated converted content is outputted may be checked through the fourth interface 14. Exemplarily, the original content source is partially transformed and displayed on the first display of FIG. 4, and the content that is automatically generated and extracted in accordance with the characteristics of the respective displays is displayed on the remaining $(2-1)^{th}$ display, $(2-2)^{th}$ display, and third display. That is, through the fourth interface 14, the user can check the state where the transformation content that is transformed in consideration of the content source and the characteristic information of the display unit 110 is outputted.

Further, in case that the user selects detailed view 15, a content output interface may be further provided to provide the content that is outputted from the display unit 110 together with the appearance of the first vehicle 100. FIG. 9 illustrates an exemplary content output interface that is provided in case of selecting the detailed view 15 of FIG. 8. In an embodiment, the interface generation processor 124 may further collect design information of the connected first vehicle 100, and may display the content together with the design of the first vehicle 100 to provide them to the user.

The vehicle display state of the content output interface may include a design CD of the first vehicle, content 111D being outputted from the first display, and content 112D being outputted from the second display. In <a> of FIG. 9, the state of the content being provided to the display inside the vehicle is illustrated. In <b> to <e> of FIG. 9, the state of the content being provided to the display outside the vehicle is illustrated together with the vehicle exterior design. Specifically, <b> of FIG. 9 illustrates the state of the content 113D being outputted from the third display together with the front design of the vehicle, and <c> of FIG. 9 illustrates the states of the content 111D being outputted from the first display and the content 112D being output from the second display together with the right side design of the vehicle. Further, <d> of FIG. 9 illustrates the state of the content 111D being outputted from the first display together with the rear design of the vehicle. Further, <e> of FIG. 9 illustrates the states of the content 111D being outputted from the first display and the content 112D being outputted from the second display together with the left side design of the vehicle.

The user can check the content being outputted from the display unit 110 together with the design of the vehicle from various angles. That is, the user can perform a simulation of whether the content is configured and displayed in harmony with the exterior of the first vehicle 100, and thus selection and configuration of more relevant content can be supported.

A system 10 for controlling an output of content in a vehicle according to some embodiments may further include a second vehicle 140. Referring to FIG. 10, the first vehicle 100 and the second vehicle 140 may have a relationship of driving together. That is, the first vehicle 100 and the second vehicle 140 may perform platooning in which the first vehicle 100 and the second vehicle 140 move together in a group, and the second vehicle 140 may follow the first vehicle 100. In some embodiments, the second vehicle 140 may be an autonomous vehicle. The first vehicle 100 may be an autonomous vehicle, but is not limited thereto. The first vehicle 100 may be a manual driving vehicle in which driving is performed by driver's operation, and depending on the situation, the first vehicle 100 may be a vehicle in which the manual driving and the autonomous driving can be switched. In some embodiments, the second vehicle 140 may also be a purpose built vehicle, and the service that is provided by the second vehicle 140 may be dependent on the service that is provided by the first vehicle 100. That is, the first vehicle 100 and the second vehicle 140 may provide the same service to the passengers of the vehicles through expansion of the service.

The second vehicle 140 may include a display 141. The display 141 may provide information or content related to the service that is provided by the second vehicle 140 to various objects located around the second vehicle 140 or the passengers boarding the second vehicle 140.

In an embodiment, the content that is outputted from the display 141 of the second vehicle 140 may be controlled by the content output module 120. That is, the content output module 120 may control all pieces of content being output from the display unit 110 of the first vehicle 100 and the display 141 of the second vehicle 140. As illustrated in FIG. 10, through the user environment that is provided to the user equipment 130, the user may also perform a content output control for the second vehicle 140. That is, the user environment may support registration for the second vehicle 140, and may further provide the user equipment 130 with a function of outputting or setting the content source being outputted from the second vehicle 140. In accordance with a user command, the first vehicle 100 and the second vehicle 140 may display one content source together or may display different content sources, respectively.

In some embodiments, in case of outputting one content source to the display unit 110 of the first vehicle 100 and the display 141 of the second vehicle 140, the content output module 120 may configure the contents to be outputted from the display 141 of the second vehicle 140 in consideration of the relationship between the first vehicle 100 and the second vehicle 140. In some embodiments, the content output module 120 may determine and automatically convert the contents to be outputted to the display 141 of the second vehicle 140 in accordance with the distance between the first vehicle 100 and the second vehicle 140. Specifically, in case that the first vehicle 100 and the second vehicle 140 are located close to each other, it may help transferring of the information and grasping of the contents by external objects to provide the video content to the first vehicle 100 and to provide the core contents of the video content to the second vehicle 140, rather than to output the same video content in duplicate. Further, in case that the first vehicle 100 and the second vehicle 140 are located to be spaced apart for a certain distance from each other while maintaining the platooning, it may be efficient for the first vehicle 100 and the second vehicle 140 to output the same video content, respectively.

Referring to FIG. 11, the content analysis processor 121 of the content output module 120 may receive the content source, display characteristic information of the second vehicle, and location information of the second vehicle. The location information collection processor 125 may collect the location information of the second vehicle, and may provide the location information of the second vehicle to the content analysis processor 121. Further, the location information collection processor 125 may also collect the location information of the first vehicle, and may also provide the location information of the first vehicle to the content analysis processor 121.

The content analysis processor 121 may determine the distance between the first vehicle and the second vehicle in consideration of the location information of the first vehicle and the location information of the second vehicle. In case that the distance between the vehicles is equal to or smaller than a reference distance, the converted content for conversion of the main contents of the content source is provided to the display 141 of the second vehicle 140 in order to prevent the same content source from being displayed together in the first vehicle 100 and the second vehicle 140.

In case that the distance between the first vehicle and the second vehicle is equal to or less than the reference distance, the content analysis processor 121 generates first content conversion information. The first content conversion information corresponds to information for converting the main contents of the content source in consideration of the characteristic information of the display 141. The content conversion processor 122 generates the first converted content based on the first content conversion information. The content providing processor 123 outputs the first converted content to the display 141 of the second vehicle 140.

In case that the distance between the first vehicle and the second vehicle exceeds the reference distance, the content analysis processor 121 generates the second content conversion information. Here, the second content conversion information corresponds to information for converting the content source in consideration of the characteristic information of the display 141. The content conversion processor 122 generates the second converted content based on the second content conversion information. The content providing processor 123 outputs the first converted content to the display 141 of the second vehicle 140.

That is, the system for controlling an output of content in a vehicle according to some embodiments of the present disclosure may appropriately transform and provide the content in consideration of the distance information between two vehicles that perform platooning, and accordingly, the purpose of providing the content can be achieved, and the providing effect can be further improved.

In some embodiments, the generative content generation processor 126 may transform the content source (original content source) selected from the user environment of the user equipment 130 by reflecting the user's state information therein, may generate the generative content, and may provide the generative content to the content analysis processor 121, so that the content may be transformed.

Referring to FIG. 12, a passenger P may be in a state of boarding the first vehicle 100 or the second vehicle 140. Hereinafter, explanation will be made in a state where the passenger P is boarding the first vehicle 100, but this is exemplary, and the same function or operation can be provided even in a state where the passenger P is boarding the second vehicle 140.

The generative content generation processor 126 may include a state collection processor 126A and a generation model 126B. The state collection processor 126A may collect state information of the passenger P. The state information may include any one of emotional state information (pleasure, sadness, anger, normal, and the like) of the passenger P, information capable of checking a health state (body temperature, blood pressure, blood sugar, pulse, heart rate, and the like), and a physical activity state (movement or change in the body). Such state information may be collected in real time or in near real time, and the original content source may be transformed in real time or in near real time through reflection of the state information therein, and the generative content may be generated.

The generation model 126B may generate the generative content by reflecting the user's state information in the provided content source. The generation model 126B may be an artificial intelligence learning model that automatically generates a video or an image, but is not limited thereto. Here, the reflection of the state information may mean that the state in accordance with the user's state information is displayed in the content source or the contents of the content source is partially changed in accordance with the state information, and the generation model 126B may automatically perform a process of transforming the content source by reflecting such a change therein.

Exemplarily, the original content source may be an exercise content, and an avatar corresponding to the user's body may be displayed. The generative content generation processor 126 may generate the generative content so that the posture of the avatar is transformed in accordance with the user's state information (body activity state), and may output the generative content to the passenger P. Accordingly, it may be guided that the passenger P follows the exercise content.

Further, the original content source may be video content or music content, and the generation model 126B may determine the generative content that corresponds to the user's emotional state. That is, the generative content generation processor 126 may configure the generative content in consideration of the user's emotional state by selecting the video content or music content suitable for the user's emotional state, and may make the generative content be outputted to the passenger P.

Further, the original content source may be the video content or music content, and the generation model 126B may generate the generative content so as to include warning information or alert information about user's health conditions. That is, the generative content generation processor 126 may configure the generative content so that the warning or alert about the health conditions is included in the video content or music content in consideration of the user's health conditions, and may make the generative content to the passenger P.

The method for controlling an output of content in a vehicle according to some embodiments of the present disclosure may be a method for controlling content that is outputted to the first display and the second display which are adjacently disposed in the first vehicle. Here, a processor may mean the content output module 120 of the system 10 for controlling an output of content in a vehicle. The method includes: generating content conversion information by analyzing a content source, characteristic information of the first display, and characteristic information of the second display; generating converted content by converting the content source based on the content conversion information; and providing the converted content to the first display and the second display.

In some embodiments, the generating of the converted content may determine a main display on which the content source is outputted and a sub display on which the content source is not outputted between the first display and the second display based on the characteristic information of the first display and the characteristic information of the second display, and the content conversion information may include: first content conversion information for converting main contents of the content source into additional contents in consideration of characteristic information of the sub display; and second content conversion information for converting the content source in consideration of characteristic information of the main display, and the converted content may include: a first converted content that is generated based on the first content conversion information and is provided to the sub display; and a second converted content that is generated based on the second content conversion information and is provided to the main display.

In some embodiments, a touch panel may be formed on only any one of the first display and the second display, and in case that the content source includes a touch input interface, the generating of the converted content may include generating the second content conversion information so that the touch input interface is displayed to correspond to the display on which the touch panel is formed.

In some embodiments, a touch panel may be formed to correspond to a specific area of the first display, and in case that the content source includes a touch input interface, the generating of the converted content may include generating the second content conversion information so that the touch input interface is displayed to correspond to the specific area of the first display on which the touch panel is formed.

In some embodiments, the first display and the second display may operate at different scan rates, and the generating of the converted content may include configuring at least one of the second content conversion information and the first content conversion information so that a boundary area is outputted between the first display and the second display in case that there occurs a difference between scan rates of the first display 111 and the second display 112, which is larger than a predetermined threshold value.

In some embodiments, the method may further include implementing a user environment including a content selection interface that determines the content source and a content output interface that provides a display state of the vehicle in accordance with the content conversion information and providing the implemented user environment to a user equipment.

In some embodiments, the vehicle display state of the content output interface may be configured to display a design of the first vehicle, content that is outputted on the first display, and content that is outputted on the second display together.

In some embodiments, a second vehicle including a third display is further provided, and the method may further include configuring contents to be outputted on the third display based on the content source in consideration of a relationship between the second vehicle and the first vehicle, and providing the configured contents to the third display.

In some embodiments, the method may further include collecting state information of a passenger boarding the vehicle in real time or in near real time, generating generative content obtained by transforming an original content source in real time or in near real time in accordance with the state information of the passenger, and providing the generative content to the content source.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the embodiments be considered in all respects as illustrative and not restrictive, reference being made to the appended claims rather than the foregoing description to indicate the scope of the disclosure.

What is claimed is:

1. A system for controlling an output of content in a vehicle, the system comprising:
    a first vehicle;
    a first display disposed in the first vehicle;
    a second display disposed in the first vehicle next to the first display, and including a display panel of a different type from the first display; and
    a content output module configured to control content that is outputted onto the first display and the second display, wherein the content output module includes:
    a content analysis processor configured to generate content conversion information by analyzing a content source, characteristic information of the first display, and characteristic information of the second display, wherein the characteristic information comprises information related to the scan rate of the display panel;
    a content conversion processor configured to generate a converted content by converting the content source based on the content conversion information; and a content providing processor configured to provide the converted content to the first display and the second display, wherein the first display and the second display operate at different scan rates, and wherein in case that there occurs a difference between scan rates of the first display and the second display, which is larger than a predetermined threshold value, the content analysis processor is configured to generate the content conversion information so that a boundary area is outputted between the first display and the second display.

2. The system of claim 1, wherein the content analysis processor is configured to determine a main display on which the content source is outputted and a sub display on which the content source is not outputted between the first display and the second display based on the characteristic information of the first display and the characteristic information of the second display, wherein the content conversion information includes first content conversion information for converting main contents of the content source into additional contents in consideration of characteristic information of the sub display, and second content conversion information for converting the content source in consideration of characteristic information of the main display, and wherein the converted content includes a first converted content that is generated based on the first content conversion information and is provided to the sub display, and a second converted content that is generated based on the second content conversion information and is provided to the main display.

3. The system of claim 2, wherein a touch panel is formed on only any one of the first display and the second display, and wherein in case that the content source includes a touch input interface, the content analysis processor is configured to generate the second content conversion information so that the touch input interface is displayed to correspond to the display on which the touch panel is formed.

4. The system of claim 2, wherein a touch panel is formed to correspond to a specific area of the first display, and wherein in case that the content source includes a touch input interface, the content analysis processor is configured to generate the second content conversion information so that the touch input interface is displayed to correspond to the specific area of the first display on which the touch panel is formed.

5. The system of claim 1, further comprising a second vehicle including a third display, wherein the content output module is configured to configure contents to be outputted on the third display based on the content source in consideration of a relationship between the second vehicle and the first vehicle and to provide the configured contents to the third display.

6. The system of claim 1, wherein the content output module is configured to:

collect state information of a passenger boarding the vehicle in real time, generate generative content obtained by transforming an original content source in real time in accordance with the state information of the passenger, and provide the generative content to the content analysis processor as the content source.

7. A method performed by a processor for controlling an output of content in a vehicle, which is outputted on a first display and a second display adjacently disposed in a first vehicle, wherein the second display includes a display panel of a different type from the first display, the method comprising:

generating content conversion information by analyzing a content source, characteristic information of the first display, and characteristic information of the second display, wherein the characteristic information comprises information related to the scan rate of the display panel;

generating a converted content by converting the content source based on the content conversion information; and providing the converted content to the first display and the second display, wherein the first display and the second display operate at different scan rates, and wherein the generating of the content conversion information includes generating the content conversion information so that a boundary area is outputted between the first display and the second display in case that there occurs a difference between the scan rates of the first display and the second display, which is larger than a predetermined threshold value.

* * * * *